United States Patent
Cunningham et al.

(10) Patent No.: US 10,701,091 B1
(45) Date of Patent: Jun. 30, 2020

(54) SYSTEM AND METHOD FOR VERIFYING A CYBERTHREAT

(71) Applicant: FireEye, Inc., Milpitas, CA (US)

(72) Inventors: Sean Cunningham, Washington, DC (US); Robert Dana, Springfield, VA (US); Joseph Nardone, Arlington, VA (US); Joseph Faber, Round Hill, VA (US); Kevin Arunski, Sterling, VA (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 16/043,004

(22) Filed: Jul. 23, 2018

Related U.S. Application Data

(63) Continuation of application No. 15/226,839, filed on Aug. 2, 2016, now Pat. No. 10,033,748, which is a
(Continued)

(51) Int. Cl.
*G06F 11/00* (2006.01)
*H04L 29/06* (2006.01)
*G06F 21/55* (2013.01)

(52) U.S. Cl.
CPC ........ *H04L 63/1416* (2013.01); *G06F 21/554* (2013.01); *H04L 63/1441* (2013.01);
(Continued)

(58) Field of Classification Search
CPC ............. H04L 63/441; H04L 29/06877; H04L 29/0684; H04L 63/14; H04L 63/1408
(Continued)

(56) References Cited

U.S. PATENT DOCUMENTS

| | | |
|---|---|---|
| 4,292,580 A | 9/1981 | Ott et al. |
| 5,175,732 A | 12/1992 | Hendel et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.

(Continued)

*Primary Examiner* — Chris Parry
(74) *Attorney, Agent, or Firm* — Rutan & Tucker, LLP

(57) ABSTRACT

A computerized method to identify potentially malicious code in a network is described. Herein, information associated with a threat is analyzed to yield intelligence that includes instructions or indicators related to the threat. Based on the intelligence, a determination is made as to an endpoint device, which includes an endpoint agent, is to (i) receive at least one of the instructions or the indicators, (ii) conduct an examination of memory of the endpoint device for data corresponding to any of the instructions or the indicators, and (iii) obtain results of the examination. Verification information, including at least a portion of the results of the examination by the endpoint device and an identifier for the endpoint device, is gathered and correlated to determine whether such information corresponds to a verified threat. Thereafter, a notification, including a portion of the verification information, is sent to identify the verified threat.

21 Claims, 4 Drawing Sheets

Related U.S. Application Data continuation of application No. 14/216,453, filed on Mar. 17, 2014, now Pat. No. 9,413,781.

(60) Provisional application No. 61/800,796, filed on Mar. 15, 2013.

(52) U.S. Cl.
CPC .... *H04L 29/0687* (2013.01); *H04L 29/06877* (2013.01); *H04L 29/06884* (2013.01); *H04L 63/14* (2013.01); *H04L 63/1408* (2013.01)

(58) Field of Classification Search
USPC .......................................................... 726/23
See application file for complete search history.

(56) References Cited

U.S. PATENT DOCUMENTS

| | | | |
|---|---|---|---|
| 5,319,776 | A | 6/1994 | Hile et al. |
| 5,440,723 | A | 8/1995 | Arnold et al. |
| 5,490,249 | A | 2/1996 | Miller |
| 5,657,473 | A | 8/1997 | Killean et al. |
| 5,802,277 | A | 9/1998 | Cowlard |
| 5,842,002 | A | 11/1998 | Schnurer et al. |
| 5,960,170 | A | 9/1999 | Chen et al. |
| 5,978,917 | A | 11/1999 | Chi |
| 5,983,348 | A | 11/1999 | Ji |
| 6,088,803 | A | 7/2000 | Tso et al. |
| 6,092,194 | A | 7/2000 | Touboul |
| 6,094,677 | A | 7/2000 | Capek et al. |
| 6,108,799 | A | 8/2000 | Boulay et al. |
| 6,154,844 | A | 11/2000 | Touboul et al. |
| 6,269,330 | B1 | 7/2001 | Cidon et al. |
| 6,272,641 | B1 | 8/2001 | Ji |
| 6,279,113 | B1 | 8/2001 | Vaidya |
| 6,298,445 | B1 | 10/2001 | Shostack et al. |
| 6,357,008 | B1 | 3/2002 | Nachenberg |
| 6,424,627 | B1 | 7/2002 | Sorhaug et al. |
| 6,442,696 | B1 | 8/2002 | Wray et al. |
| 6,484,315 | B1 | 11/2002 | Ziese |
| 6,487,666 | B1 | 11/2002 | Shanklin et al. |
| 6,493,756 | B1 | 12/2002 | O'Brien et al. |
| 6,550,012 | B1 | 4/2003 | Villa et al. |
| 6,775,657 | B1 | 8/2004 | Baker |
| 6,831,893 | B1 | 12/2004 | Ben Nun et al. |
| 6,832,367 | B1 | 12/2004 | Choi et al. |
| 6,895,550 | B2 | 5/2005 | Kanchirayappa et al. |
| 6,898,632 | B2 | 5/2005 | Gordy et al. |
| 6,907,396 | B1 | 6/2005 | Muttik et al. |
| 6,941,348 | B2 | 9/2005 | Petry et al. |
| 6,971,097 | B1 | 11/2005 | Wallman |
| 6,981,279 | B1 | 12/2005 | Arnold et al. |
| 7,007,107 | B1 | 2/2006 | Ivchenko et al. |
| 7,028,179 | B2 | 4/2006 | Anderson et al. |
| 7,043,757 | B2 | 5/2006 | Hoefelmeyer et al. |
| 7,058,822 | B2 | 6/2006 | Edery et al. |
| 7,069,316 | B1 | 6/2006 | Gryaznov |
| 7,080,407 | B1 | 7/2006 | Zhao et al. |
| 7,080,408 | B1 | 7/2006 | Pak et al. |
| 7,093,002 | B2 | 8/2006 | Wolff et al. |
| 7,093,239 | B1 | 8/2006 | van der Made |
| 7,096,498 | B2 | 8/2006 | Judge |
| 7,100,201 | B2 | 8/2006 | Izatt |
| 7,107,617 | B2 | 9/2006 | Hursey et al. |
| 7,159,149 | B2 | 1/2007 | Spiegel et al. |
| 7,213,260 | B2 | 5/2007 | Judge |
| 7,231,667 | B2 | 6/2007 | Jordan |
| 7,240,364 | B1 | 7/2007 | Branscomb et al. |
| 7,240,368 | B1 | 7/2007 | Roesch et al. |
| 7,243,371 | B1 | 7/2007 | Kasper et al. |
| 7,249,175 | B1 | 7/2007 | Donaldson |
| 7,287,278 | B2 | 10/2007 | Liang |
| 7,308,716 | B2 | 12/2007 | Danford et al. |
| 7,328,453 | B2 | 2/2008 | Merkle, Jr. et al. |
| 7,346,486 | B2 | 3/2008 | Ivancic et al. |
| 7,356,736 | B2 | 4/2008 | Natvig |
| 7,386,888 | B2 | 6/2008 | Liang et al. |
| 7,392,542 | B2 | 6/2008 | Bucher |
| 7,418,729 | B2 | 8/2008 | Szor |
| 7,428,300 | B1 | 9/2008 | Drew et al. |
| 7,441,272 | B2 | 10/2008 | Durham et al. |
| 7,448,084 | B1 | 11/2008 | Apap et al. |
| 7,458,098 | B2 | 11/2008 | Judge et al. |
| 7,464,404 | B2 | 12/2008 | Carpenter et al. |
| 7,464,407 | B2 | 12/2008 | Nakae et al. |
| 7,467,408 | B1 | 12/2008 | O'Toole, Jr. |
| 7,472,418 | B1 | 12/2008 | McCorkendale et al. |
| 7,478,428 | B1 | 1/2009 | Thomlinson |
| 7,480,773 | B1 | 1/2009 | Reed |
| 7,487,543 | B2 | 2/2009 | Arnold et al. |
| 7,496,960 | B1 | 2/2009 | Chen et al. |
| 7,496,961 | B2 | 2/2009 | Zimmer et al. |
| 7,519,990 | B1 | 4/2009 | Xie |
| 7,523,493 | B2 | 4/2009 | Liang et al. |
| 7,530,104 | B1 | 5/2009 | Thrower et al. |
| 7,540,025 | B2 | 5/2009 | Tzadikario |
| 7,546,638 | B2 | 6/2009 | Anderson et al. |
| 7,565,550 | B2 | 7/2009 | Liang et al. |
| 7,568,233 | B1 | 7/2009 | Szor et al. |
| 7,584,455 | B2 | 9/2009 | Ball |
| 7,603,715 | B2 | 10/2009 | Costa et al. |
| 7,607,171 | B1 | 10/2009 | Marsden et al. |
| 7,639,714 | B2 | 12/2009 | Stolfo et al. |
| 7,644,441 | B2 | 1/2010 | Schmid et al. |
| 7,657,419 | B2 | 2/2010 | van der Made |
| 7,676,841 | B2 | 3/2010 | Sobchuk et al. |
| 7,694,150 | B1 | 4/2010 | Kirby |
| 7,698,548 | B2 | 4/2010 | Shelest et al. |
| 7,707,633 | B2 | 4/2010 | Danford et al. |
| 7,712,136 | B2 | 5/2010 | Sprosts et al. |
| 7,730,011 | B1 | 6/2010 | Deninger et al. |
| 7,739,740 | B1 | 6/2010 | Nachenberg et al. |
| 7,779,463 | B2 | 8/2010 | Stolfo et al. |
| 7,784,097 | B1 | 8/2010 | Stolfo et al. |
| 7,832,008 | B1 | 11/2010 | Kraemer |
| 7,836,502 | B1 | 11/2010 | Zhao et al. |
| 7,849,506 | B1 | 12/2010 | Dansey et al. |
| 7,854,007 | B2 | 12/2010 | Sprosts et al. |
| 7,869,073 | B2 | 1/2011 | Oshima |
| 7,877,803 | B2 | 1/2011 | Enstone et al. |
| 7,886,065 | B1 | 2/2011 | Satish et al. |
| 7,904,959 | B2 | 3/2011 | Sidiroglou et al. |
| 7,908,660 | B2 | 3/2011 | Bahl |
| 7,930,738 | B1 | 4/2011 | Petersen |
| 7,937,387 | B2 | 5/2011 | Frazier et al. |
| 7,937,761 | B1 | 5/2011 | Bennett |
| 7,949,849 | B2 | 5/2011 | Lowe et al. |
| 7,996,556 | B2 | 8/2011 | Raghavan et al. |
| 7,996,836 | B1 | 8/2011 | McCorkendale et al. |
| 7,996,904 | B1 | 8/2011 | Chiueh et al. |
| 7,996,905 | B2 | 8/2011 | Arnold et al. |
| 8,006,305 | B2 | 8/2011 | Aziz |
| 8,010,667 | B2 | 8/2011 | Zhang et al. |
| 8,020,206 | B2 | 9/2011 | Hubbard et al. |
| 8,028,338 | B1 | 9/2011 | Schneider et al. |
| 8,042,182 | B2 | 10/2011 | Milani Comparetti et al. |
| 8,042,184 | B1 | 10/2011 | Batenin |
| 8,045,094 | B2 | 10/2011 | Teragawa |
| 8,045,458 | B2 | 10/2011 | Alperovitch et al. |
| 8,069,484 | B2 | 11/2011 | McMillan et al. |
| 8,087,086 | B1 | 12/2011 | Lai et al. |
| 8,136,149 | B2 | 3/2012 | Freund |
| 8,171,553 | B2 | 5/2012 | Aziz et al. |
| 8,176,049 | B2 | 5/2012 | Deninger et al. |
| 8,176,480 | B1 | 5/2012 | Spertus |
| 8,201,246 | B1 | 6/2012 | Wu et al. |
| 8,204,984 | B1 | 6/2012 | Aziz et al. |
| 8,214,905 | B1 | 7/2012 | Doukhvalov et al. |
| 8,220,055 | B1 | 7/2012 | Kennedy |
| 8,225,288 | B2 | 7/2012 | Miller et al. |
| 8,225,373 | B2 | 7/2012 | Kraemer |
| 8,233,882 | B2 | 7/2012 | Rogel |
| 8,234,640 | B1 | 7/2012 | Fitzgerald et al. |
| 8,234,709 | B2 | 7/2012 | Viljoen et al. |

(56) References Cited

U.S. PATENT DOCUMENTS

| | | |
|---|---|---|
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,629 B1 | 8/2014 | Cherepov et al. |
| 8,806,647 B1 | 8/2014 | Daswani et al. |
| 8,826,424 B2 * | 9/2014 | Lyne .................. G06F 21/56 713/152 |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |

(56) References Cited

U.S. PATENT DOCUMENTS

| | | |
|---|---|---|
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |

(56) References Cited

U.S. PATENT DOCUMENTS

| | | |
|---|---|---|
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0123214 A1 | 5/2007 | Mock |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0165135 A1 | 6/2009 | Lomont et al. |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0199297 A1 | 8/2009 | Jarrett et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |

(56) References Cited

U.S. PATENT DOCUMENTS

| | | |
|---|---|---|
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0173699 A1 | 7/2011 | Figlin et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0185936 A1 | 7/2012 | Lakshminarayanan |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0233696 A1 | 9/2012 | Zeng et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0278890 A1 | 11/2012 | Maatta et al. |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0232576 A1 | 9/2013 | Kamikis et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0333040 A1 | 12/2013 | Diehl et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0059668 A1 | 2/2014 | Holloway et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2017/0244754 A1* | 8/2017 | Kinder ............ H04L 63/1466 |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |
| 2019/0073224 A1* | 3/2019 | Tian ..................... G06N 20/00 |

FOREIGN PATENT DOCUMENTS

| | | |
|---|---|---|
| JP | 2011-053893 A | 3/2011 |
| KR | 10-1132197 B1 | 4/2012 |
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"When Virtual is Better Than Real", IEEExplore Digital Library, available at, http://ieeexplore.ieee.org/xpl/articleDetails.isp?reload=true&arnumbe- r=990073, (Dec. 7, 2013).

(56) References Cited

OTHER PUBLICATIONS

Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., "'Analyzing and exploiting network behaviors of malware.'", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).
Venezia, Paul, "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
EP 14762444.9 filed Oct. 15, 2015 Supplementary European Search Report dated Oct. 13, 2016.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

(56) References Cited

OTHER PUBLICATIONS

Oberheide et al., CloudAV.sub.--N-Version Antivirus in the Network Cloud, 17th USENIX Security Symposium USENIX Security '08 Jul. 28-Aug. 1, 2008 San Jose, CA.

PCT/US2014/030633 filed Mar. 17, 2014 International Search Report dated Aug. 5, 2014.

U.S. Appl. No. 14/216,453, filed Mar. 17, 2014 Non-Final Rejection dated Aug. 20, 2015.

U.S. Appl. No. 14/216,453, filed Mar. 17, 2014 Notice of Allowance dated Feb. 12, 2016.

U.S. Appl. No. 15/226,839, filed Aug. 2, 2016 Non-Final Office Action dated Jul. 3, 2017.

U.S. Appl. No. 15/226,839, filed Aug. 2, 2016 Notice of Allowance dated Apr. 12, 2018.

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

EP 14762444.9 filed Oct. 15, 2015 Office Action dated Feb. 25, 2019.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

SYSTEM AND METHOD FOR VERIFYING A CYBERTHREAT

CROSS REFERENCE TO RELATED APPLICATIONS

This application is a continuation of U.S. patent application Ser. No. 15/226,839 filed Aug. 2, 2016, now U.S. Pat. No. 10,033,748 issued Jul. 24, 2018, which is a continuation of U.S. patent application Ser. No. 14/216,453 filed Mar. 17, 2014, now U.S. Pat. No. 9,413,781 issued Aug. 9, 2016, which claims the benefit priority of U.S. provisional patent application No. 61/800,796 filed Mar. 15, 2013 and entitled "System and Method Employing Structured Intelligence to Verify and Contain Threats at Endpoints", the entire contents of which is incorporated herein by reference.

BACKGROUND

1. Field

The present inventive concept relates to a system and method to detect and contain threatening executable code. More specifically, an embodiment of the present inventive concept relates to a system and method operable to improve identification and containment of threatening software across a plurality of endpoints.

2. Discussion of Related Art

Systems currently exist to detect executable code as it passes over a network. These systems employ a variety of methods of detection, including analyzing traffic at various protocol and application layers as well as analyzing common application artifacts such as email messages. These systems can analyze executable code using a variety of methods to extract information about the code's behavior. Existing systems use the extracted information to classify the code as benign or a potential threat.

While such existing systems may be effective at identifying threats represented by executable code in network traffic, they are not suitable to identify devices or users that may have been exposed to the threat. For example, existing systems and methods cannot conclusively determine if a threat or piece of code has reached a device on which it could be executed or, once such a threat or piece of code has reached such a device, whether or not it has actually executed.

Further, analysis of information and data traffic and application artifacts, and generation of information therefrom, takes time. During the process of analysis, there is a risk that a threatening piece of code may be transmitted to, received by, and potentially executed on a device. Even if a security investigator using existing systems can successfully determine that a threat has landed or executed, intervention against the threat using existing systems and methods must be performed manually or by channels outside the normal network, sometimes requiring physical access to the device, thus further extending the time between initiating analysis and effectively reacting to discovery of a threat. During the time it takes to implement existing systems and methods to detect, control or contain threatening software, such threatening software may be allowed to further its malicious functions.

Thus, there is a need for a system and method that provides improved detection, verification, tracking and reaction to threatening software.

SUMMARY

Embodiments of the present inventive concept described herein remedy the aforementioned problems by providing a unique system and method operable to detect and contain threatening executable code.

Embodiments of the present inventive concept include software installed at an "endpoint", that is, at a device, such as a computer or mobile device, including a processor that is configured to communicate with a network, that is to be monitored and/or audited according to embodiments of the present inventive concept. Endpoints may illustratively include, e.g., client/server desktop computers, laptop/notebook computers, process controllers, medical devices, data acquisition devices, mobile devices such as smartphones and tablet computers, intermediate network devices and nodes such as network servers, and/or any other intelligent electronic device having network connectivity that may be configured to implement an endpoint agent. The endpoint agent(s) allow gathering of data and information relating to a network and its contents and components by utilizing audit modules to examine endpoints for evidence they have been exposed to a given threat, and to determine whether that threat (most commonly, executable code) has executed or otherwise been realized.

An endpoint agent may be installed locally at an endpoint or elsewhere so long as it is capable of accessing system information and memory of, and of auditing, the endpoint to which it is assigned. Utilizing software configured to monitor, and that is preferably installed on, endpoints means being present and persistent for extended timeframes and providing consistent and persistent monitoring and analysis. This allows embodiments of the system of the present inventive concept to record historical information about system state at endpoints, especially information relevant to common threat mechanisms, such that the information may be used to detect threats after they have landed, executed, and even taken action to hide their presence.

The endpoint agent(s) may then communicate information back to the original detecting and coordinating parts of the system as well as to any other appropriately-configured security software or platforms. The endpoint agent thus may enable a user, or an automated component of the system in certain embodiments, to take action against a threat on the endpoint(s), including by using the endpoint agent(s) to contain the threat. This containment strategy is unique, including because it is in response to a threat verified using present and historical data, and retains the ability to contact, monitor, remediate and ultimately lift containment on the affected endpoint while limiting the threat's ability to communicate.

The system and method of the present inventive concept are a departure from and an improvement over conventional systems in that, among other things, the system and method of the present inventive concept allows an investigator to determine whether a threat has persisted or executed. It allows that information to be communicated back to the detection mechanism (or other system) such that a user (or machine) may make a decision to take further action such as to contain the threat quickly and/or permit the system to do so automatically. All of this may take place in a matter of seconds, minutes, or hours.

These and other goals of the present inventive concept may be achieved by providing a method to identify potentially malicious code at an endpoint, e.g., a first endpoint among one or more endpoints, in a network. The method may include the step of using a threat monitor to monitor network data and extract a set of network data therefrom that includes "threat intelligence" or just "intelligence," which is any information exchanged or residing within the system network that may have strategic importance for detecting, tracking or analyzing a present or past threat. The threat monitor may employ a network monitor more specifically to monitor the network. That set of network data commonly includes executable code, and is processed to generate a report, which may be in the form of structured data and information. The set of network data may be processed using an analyzer of the threat monitor, for example a static or a dynamic analyzer.

A verifier including an agent coordinator may receive the report, and based thereon issue (i) instructions and/or (ii) indicators to an endpoint agent. Instructions may tell an agent to perform or not to perform certain actions and may comprise executable code or other instructions in a format that may be acted on by the endpoint agent. Indicators are pieces of information, such as logical "if-then" tests, data ranges, and other types of information, that may be used for comparison with information that resides on or is accessible to the endpoint or for configuring an audit to be performed on the endpoint. The endpoint agent may then process the (i) instructions and/or (ii) indicators to generate verification information.

In a preferred embodiment, the endpoint agent process may include one or more additional steps, after it takes in or receives instructions and/or indicators. The instructions and indicators may first pass to an audit controller that may control and configure tasking for an audit module of the endpoint agent. The audit module may retrieve, consolidate, and/or index information residing on or retrievable by the endpoint. It may do so intermittently or continuously pursuant to pre-programmed instructions automatically executed within the system and/or as prompted by additional requests from the audit controller, such as in response to a set of instructions and/or indicators from the verifier. The audit module may also form part of a persistent monitor, which also includes a buffered storage module for controlling storage of audit data created by an audit module.

Once the audit controller has provided instructions and/or indicators to the audit module, the audit module may perform an inspection of data and information residing on or accessible to the endpoint, and may further inspect its own records and audit data stored by the endpoint agent, and create resulting audit data. The audit data may then be passed to the buffered storage module for storage under conditions that may be pre-determined or that may vary with instructions provided by other components of the system or based on computer learning and/or system variances and needs. The audit data may then pass to an indicator matcher, which may or may not have been configured by the audit controller for example based on the instructions and/or indicators which prompted the audit being evaluated, and the indicator matcher may then process the audit data, including any hit candidates, to create recommendations to the audit controller on certain audit data that should be packaged up for transmission as verification information to be exported from the endpoint agent. In simpler embodiments, the audit data itself may be directly passed out of the endpoint agent as the verification information.

Still further, the verification information may be passed from the endpoint agent to the verifier, and processed by the verifier to determine whether the verification information indicates a verified threat. In performing this processing, the verification information may be compared against one or both of data obtained from another endpoint and data obtained from a security information and event management module (SIEM). The verification information, and possibly information regarding whether it represents a verified threat, may also be passed to the SIEM and/or the threat monitor. The method may further include changing the configuration and/or settings of the threat monitor based on the verification information.

Yet still further, the method may include steps for performing a containment action based on the verification information. A "containment action" is an action, for example changing or providing instructions to change endpoint system permissions, settings, communication patterns, execution priorities, memory allocations and similar properties, and is intended to effect the operation or disposition of potentially malicious software and/or information or data related to the potentially malicious software. In a preferred embodiment, after the verifier processes verification information and determines that there is verified threat information from the endpoint, the agent controller of the verifier configures a containment package including instructions for containment actions to be taken and/or executable code for an additional module which may be installed as part of the endpoint agent and which may undertake certain containment actions (a "containment agent").

Additional aspects, advantages, and utilities of the present inventive concept will be set forth in part in the description which follows and, in part, will be obvious from the description, or may be learned by practice of embodiments of the present inventive concept.

The foregoing is intended to be illustrative and is not meant in a limiting sense. Many features and subcombinations of the present inventive concept may be made and will be readily evident upon a study of the following specification and accompanying drawings comprising a part thereof. These features and subcombinations may be employed without reference to other features and subcombinations.

BRIEF DESCRIPTION OF THE DRAWINGS

Embodiments of the present inventive concept are described in detail below with reference to the attached drawing figures, wherein.

Figure 1:
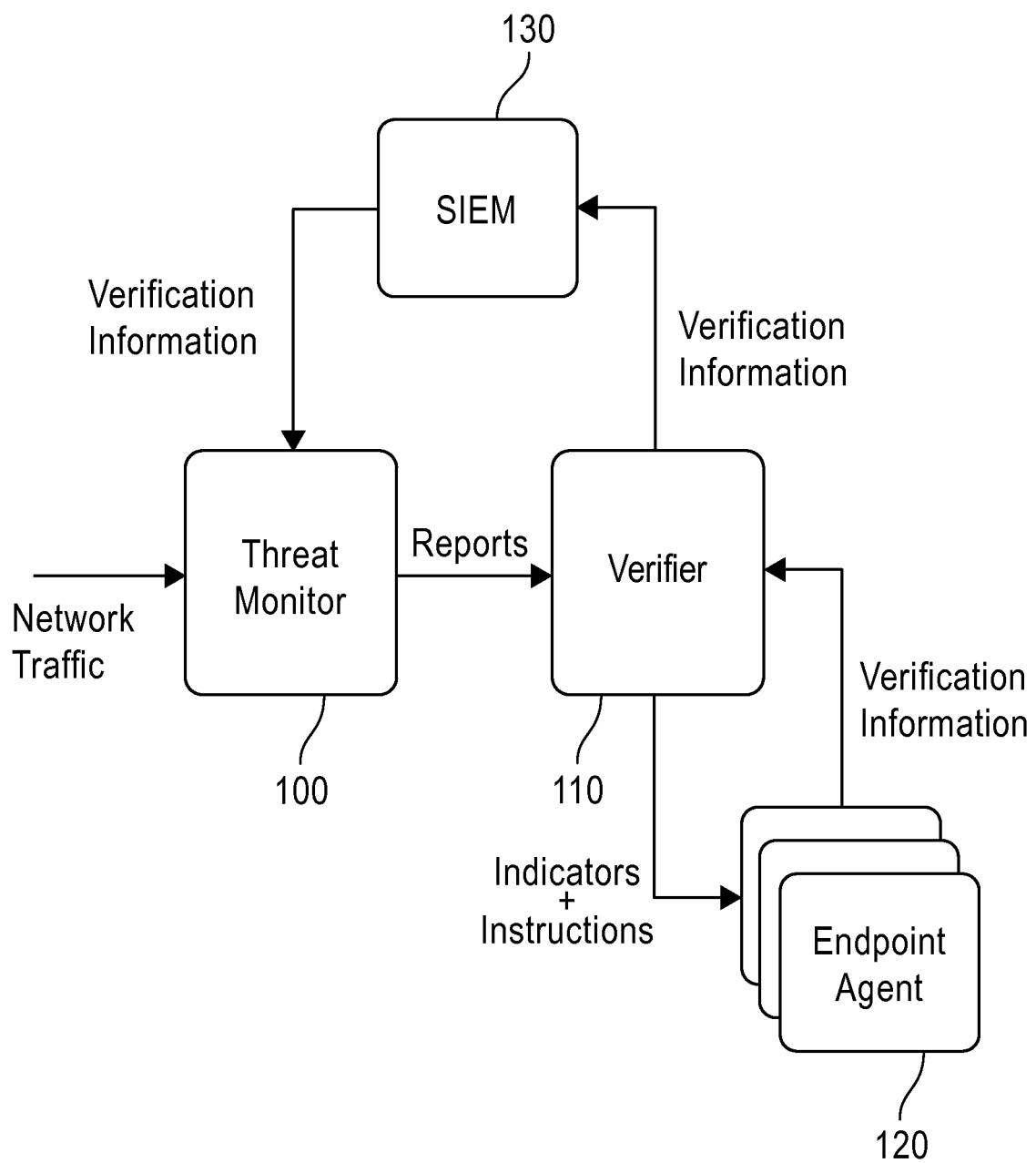
FIG. 1 is a flowchart, partially in block diagram form, illustrating an example of a system or process of the present inventive concept to identify potentially malicious software at an endpoint.

The drawing figures do not limit the present inventive concept to the specific examples disclosed and described herein. The drawings are not to scale, emphasis instead being placed upon clearly illustrating embodiments of the principles of the present inventive concept.

DETAILED DESCRIPTION

The following detailed description references the accompanying drawings that illustrate the present inventive concept. The illustrations and description are intended to describe aspects of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to "one embodiment," "an embodiment," or "embodiments" mean that the feature or features being referred to are included in at least one embodiment of the present inventive concept. Separate references to "one embodiment," "an embodiment," or "embodiments" in this description do not always refer to the same embodiment and are also not mutually exclusive unless so stated and/or except as will be readily apparent to those skilled in the art from the description. For example, a feature, structure, act, etc. described in one embodiment may also be included in other embodiments, but may not be included in all embodiments. Thus, the present inventive concept can include a variety of combinations and/or integrations of the embodiments described herein.

An embodiment of the present inventive concept provides a system and method that improves verification, information gathering regarding, and containment of threatening or potentially threatening executable code. Executable code is not limited to native binaries but may also include documents such as Portable Document Format (PDF) or common productivity documents such as those created with software sold under the trademarks EXCEL® and WORD™, or any artifact that may be itself executed, interpreted or otherwise processed, or that may contain code which it may cause to be executed or interpreted. Executable code may be extracted according to an embodiment of the present inventive concept at any level or by content-aware inspection of any application protocol and may use cues provided by other network traffic (such as requests to update existing components), or application-specific information (such as email headers or persistent HTTP session information). A software "module" as used herein shall refer to all or a part of a software program employed to perform a function described herein, and is not intended to imply that such code is or is not capable of independent and/or isolated functioning apart from other code nor that such code was or was not developed independently or in conjunction with other software code, nor that such code physically resides and/or is executed together with or apart from other code.

FIG. 1 illustrates an overview of a system of an embodiment of the present inventive concept with its primary subsystems. The system includes a threat monitor 100 that detects threats such as those represented by executable code, typically by analyzing traffic on a computer network and performing analysis to determine if that traffic contains executable code that may represent a threat. Network "traffic" may include any data transmitted over a network. Network traffic may include text, software, images, audio, or other digital data. Examples of network traffic include e-mail messages, instant messages, web content, or any network data that may be transmitted using a Hypertext Transfer Protocol, Hypertext Markup Language protocol, or may be transmitted in a manner suitable for display on a Web browser software application. The threat monitor 100 may copy any portion of the traffic, for example, any number of data packets from the network traffic, and may also capture metadata from the traffic. When a characteristic of the network traffic, such as a sequence of code, is identified that meets certain conditions such as those derived from intelligence known or accessible to the threat monitor 100, the threat monitor 100 may identify such a portion of the network traffic as a possible threat.

The threat monitor 100 further transmits reports for consumption, interpretation and analysis by a verifier 110. Preferably the reports are in a structured form based on a pre-determined format that may be updated from time to time using updates introduced into the system externally or based on computer learning and/or adaptations to network traffic or verification information collected by the system over time. The verifier 110 verifies reports provided by the threat monitor. It does so in part by supplying endpoint agents 120 installed at, or at least operable to access the memory or operating system of, endpoints (as described in more detail below) with threat indicators and instructions. Each endpoint may be referred to as a "node," and the endpoint agents 120 enable the evaluation of such indicators and execution of such instructions, relying on information regarding historical system state and information gathered in response to such indicators and instructions to determine if a threat is present and, potentially, whether the threat (often, executable code) has executed or otherwise been realized. The endpoint agents 120 are further operable to communicate threat verification information (including, for example audit data and hit data, and other contextual data and perhaps the indicators and instructions themselves as well) collected and/or generated in connection with the instructions and indicators back to the verifier 110.

"Indicators" include information or functions, such as logical test instructions, which if compared against audit data or relied on to configure or conduct an audit may indicate that an endpoint or other component of a system may be compromised. Examples of indicators include descriptions of files with a specific hash sum or database entries which match a particular regular expression (example: "a file exists named 'evil.exe' that was created after 3 p.m. yesterday"). Indicators may relate to any specific type or subset of information regarding system state (including but not limited to: contents of memory, contents of storage, names of files, contents of files including both byte content and the result of any analysis such as hash sums calculated from those bytes, and contents of operating system abstractions such as a system registry). Indicators and instructions, such as logical test instructions, may be stored and transmitted in an interchange format such as XML or JSON, and may describe logical operations and predicates which may be evaluated automatically by an appropriately configured software program. A common format for such an indicator is OpenIOC, but this is not the only format capable of use in accordance with the present inventive concept.

The system of FIG. 1 may include a security information and event manager or SIEM 130 configured to consume information such as, but not limited to, verification information or other information related to one or more endpoints, and correlate the information so that a user or machine may take action based on the information. The SIEM 130 may be embodied in software, hardware, or a combination thereof. The SIEM 130 may be configured to perform one or more security management functions such as, but not limited to, gathering and/or aggregating security-related information from one or more sources. In this manner, the SIEM 130 provides improved analysis and/or control of the information. The SIEM 130 of the present inventive concept is not limited to management of security information and/or events. Indeed, it is foreseen that the SIEM 130 may include additional functionality, e.g., functionality related to identifying, processing, and/or managing security related information and/or events. It is also foreseen that one or more functions of the SIEM 130 may be handled by one or more modules other than the SIEM 130, for instance, by an appropriately-configured verifier 110 if the SIEM 130 is unavailable. It is also foreseen that the present inventive concept may include one or more modules in lieu of or in addition to the SIEM 130. For instance, a security information management (SIM) module, a security event management (SEM) module, and/or the like may be used in lieu of or in addition to the SIEM 130.

The SIEM 130 according to embodiments of the present inventive concept may optionally convey threat verification information back to the threat monitor 100. The SIEM 130 may correlate verification information with intelligence gathered from many sources, including prior intelligence gathered from the endpoint agent 120, intelligence gathered from other endpoint(s), and/or with definitions or against rules or tests stored in memory accessible to the SIEM and optionally updated from time to time via a communication network.

Figure 2:
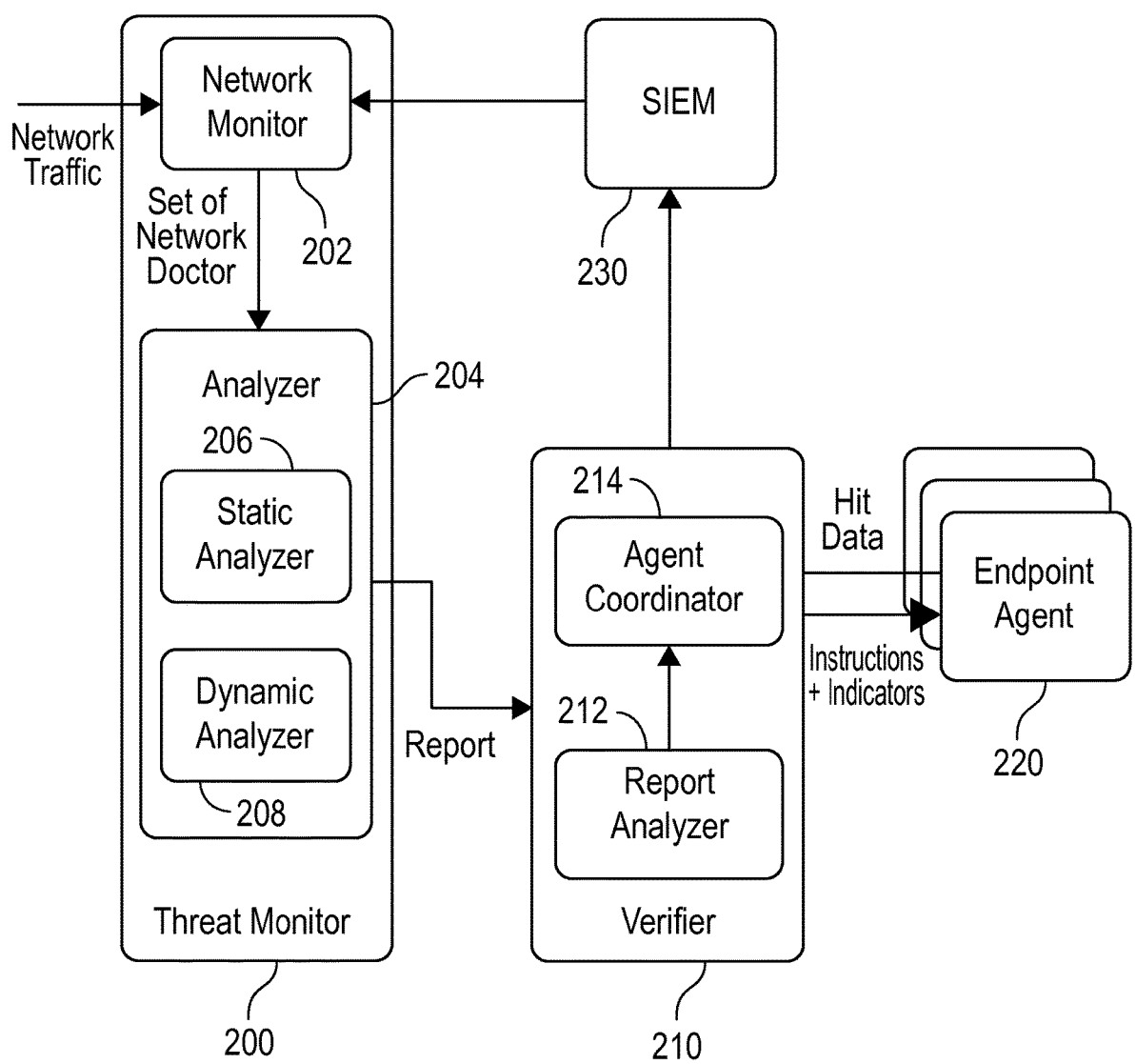
FIG. 2 is a flowchart, partially in block diagram form, illustrating an example of a system or process of the present inventive concept to identify potentially malicious software at an endpoint.

Turning now to FIG. 2, the verifier 210 of an embodiment of the present inventive concept is illustrated in additional detail along with a breakout of components of the threat monitor 200. A threat monitor 200 typically consists of components such as a network monitor 202 and one or more analyzers 204. Those components are illustrated separately in FIG. 2 because they may not always be implemented together in the same subsystem or component. However, they may be integrated in certain embodiments. A network monitor 202 monitors network traffic to identify and extract data such as executable code from the network, typically as it travels across the network. A grouping of such network data may be referred to herein as a "set." Any means to identify and extract executable code may be used in addition to raw network monitoring. The network monitor 202 sends the executable code it captures to an analyzer 204 for analysis.

The analyzer 204 gathers information about the set of network data through a variety of methods. For example, the analyzer 204 may employ a static analyzer 206 to gather information about executable code without executing it (such as by measuring its size and calculating a hash from the bytes of which it is comprised). The static analyzer 206 then adds information resulting from its analysis to a report. The analyzer 204 may further or alternatively employ or comprise a dynamic analyzer 208 to completely or partially execute the executable code and monitor its behavior, such as in a sandboxed and/or instrumented environment. The dynamic analyzer 208 may then add information resulting from its analysis to a report. A report's information may include what changes executing code attempts to make or makes to the environment where it executes, operations executing code attempts which may not change the environment, such as network connections or DNS lookups, and any other operations or behaviors of executing code that are detectable in the environment. The analyzer 204 packages the reports from its analysis mechanisms, such as the two discussed hereinabove, and uses configuration and other information (such as historical or human intelligence) to attach a designation of the type and degree of threat to a computer or user's security posed by items or network data referenced in the report.

Reports are transmitted to the verifier 210 which may consist of one or more components of software executing on one or more platforms and/or devices. The reports are communicated to a report analyzer 212 of the verifier 210. The report analyzer 212 may accept those reports via a network connection so they may be acted upon in a timely manner after detection and/or analysis. The report analyzer 212 analyzes a report and yields intelligence, including indicators and instructions (as well as associations between those indicators and the respective items in the report(s) giving rise to them, and information added to the instructions and/or indicators that specifies one or more hosts or sets of hosts or endpoints which should specifically be contacted to verify a described threat) and communicates these to an agent coordinator 214 of the verifier 210. The report analyzer 212 may apply selection methodologies based on configuration or other analysis results to refine reports into, or select indicators and instructions that, represent a higher-fidelity representation (high-fidelity indicators) of the threat than would otherwise have been apparent from analysis of all characteristics described in the report. These may provide stronger evidence that a given threat has been received by a device or user such as an endpoint (i.e., the threat "persisted") and further help determine whether the executable code associated with the threat has been executed or "detonated" on the device.

The agent coordinator 214 interprets the intelligence, including any indicators or instructions, performs any further configuring or selection/generation of indicators and instructions that may be needed before further transmission, selects an endpoint agent(s) 220 to perform processing of the instructions and indicators, then communicates that processing work to such endpoint agent(s) 220. For example, the work for endpoint agent 220 to perform may consist of indicators and instructions on how to test those indicators, including specific configurations for individual methods to acquire relevant endpoint system state information. The agent coordinator 214 may include a system of one or more devices running one or more pieces of software that can track, enroll, uniquely identify, and communicate with endpoint agents 220, as well as assign work and configuration to be executed by specific endpoint agents 220 and retrieve the result of that work. Communications with endpoint agents 220 may occur directly or indirectly, via cryptographically and secure intermediate locations. Results of work or other threat-related information received from endpoint agents 220, or "verification information," are received as payloads that may be of an arbitrary size, and such data may be stored and forwarded in order to successfully reach an endpoint agent 220 or a component of the agent coordinator 214. If such data is stored, the data may be stored in such a way that an intermediary would not immediately be able to inspect the transmitted data, such as using a cryptographically-sound PKI method.

An endpoint agent 220 tests endpoint system state and examines memory, including by performing audits thereof and/or accessing historical information about the system or endpoint, for example to determine if an indicator it receives is satisfied. The endpoint agent 220 is installed on, or at least operable to access the memory or operating system of, one or more endpoint devices or nodes and is configured with a means to request processing work from a configured agent manager and/or agent coordinator 214, to process the work (i.e., the instructions and indicators), and provide the result of work, including verification information, when the work is in progress and/or is complete.

The endpoint agent 220 audits one or more nodes or endpoints on the network, particularly looking for specific instances of any number of "high-fidelity indicators" in current or recorded system state and memory. It may receive work from the agent coordinator 214 in the form of indicators and instructions via a cryptographically secure channel and mechanism which may entail polling, contacting intermediate devices or any other means. The various components of the endpoint agent 220 may employ one or more methods to continuously sample and record system state information so that the system is capable of "looking back in time", so to speak, for example to determine if any part of the endpoint's system state matches an indicator and also whether some previous system state matched an indicator and at what point in time it did so. Preferably, the endpoint agent 220 and its components will operate, and more specifically will perform monitoring and recording functions, in a manner that is unlikely to cause immediate loss of forensic viability of the system, such as by pre-allocating storage such that data written to disk does not overwrite disk sectors which may contain information relevant to an investigation. The workflow should be controlled to prevent unintentional operation of features or components which may negatively affect the endpoint.

The endpoint agent 220 may still further receive work in the form of instructions to update itself and/or extend its functionality by installing or uninstalling components or other software, for example instructions to install additional software on the endpoint which can make changes to system state or behavior such that malicious software may continue to operate but may not affect the endpoint and surrounding systems.

This endpoint agent 220 may be configured so that it can post the results of completed work back, including verification information, such that the agent coordinator 214 can retrieve it and utilize it. The result of an endpoint agent's 214 completed work may include hit data including information from indicators and the results of processing same, audit methods, original intelligence sources, audit data, audit results and ambient system state. The endpoint agent 220 may be configured to report back the result of the work via a cryptographically secure channel (as above, which may entail multiple devices or connectivity mechanisms), including data regarding hits or "hit data". "Hit data" is information that at least partially satisfies an indicator and/or is returned as a result of executing an instruction, i.e., that creates a "hit," and may include any number of the following: the indicator which hit on the system state or memory, a partial or complete sample of the relevant system state or memory, a time stamp associated with the sample that generated a hit, ambient data not directly associated with the indicator but that helps to identify the system or provide data not directly requested but which is available to the mechanism (for example, the host name, logged-in users, or the current contents of a DNS cache).

Figure 3:
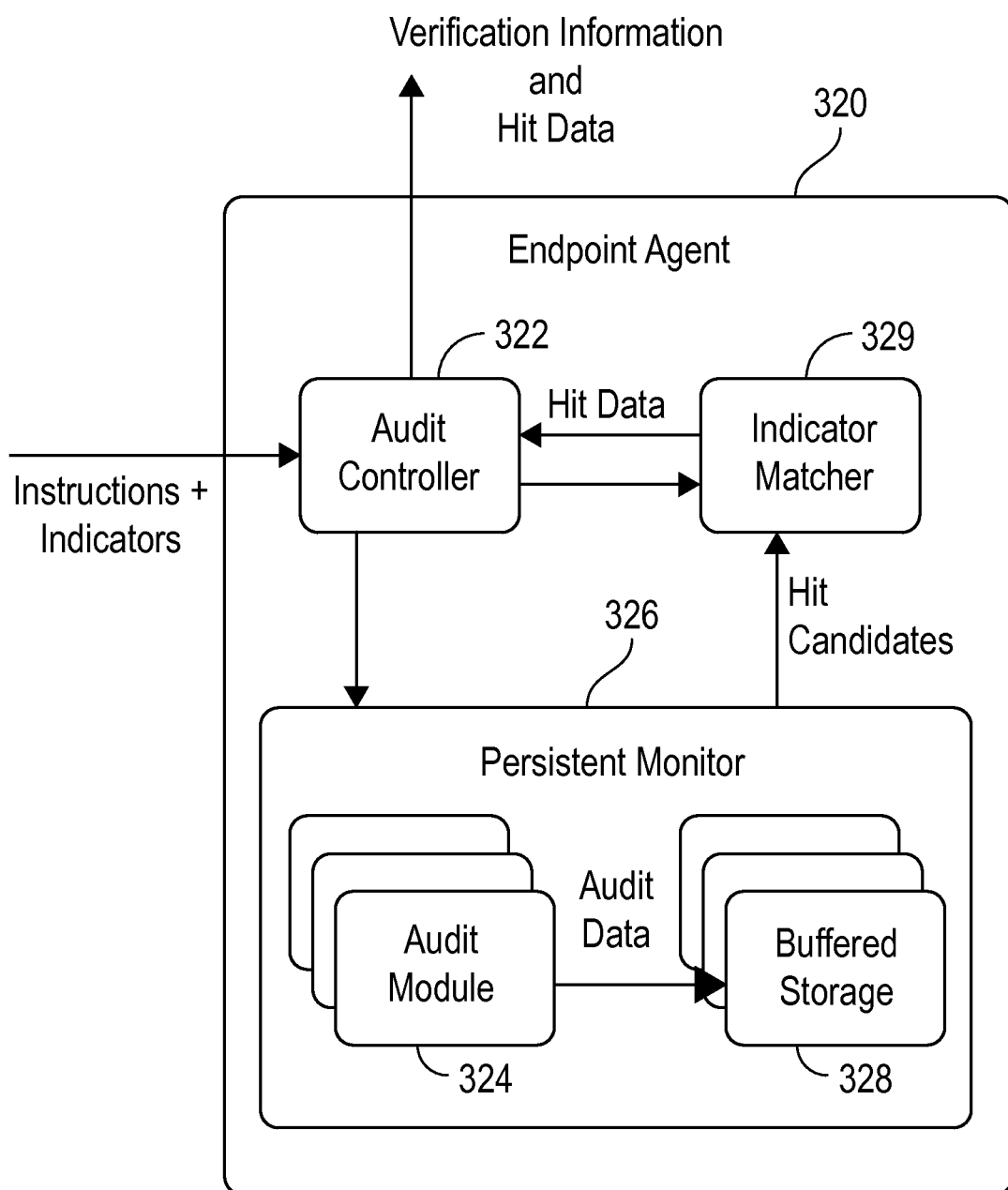
FIG. 3 is a flowchart, partially in block diagram form, illustrating an example of a system or process of the present inventive concept to perform auditing on an endpoint and produce verification information.

FIG. 3 illustrates the endpoint agent 320 in greater detail. Indicators and instructions are communicated to the endpoint agent 320 via a cryptographically secure mechanism. A component of the endpoint agent 320 is an audit controller 322, which receives such indicators and instructions. The audit controller 322 preferably controls audits of system state and memory performed by an audit module 324. In certain embodiments, the audit module 324 forms part of a persistent monitor 326 along with a buffered storage module 328, discussed in more detail below. The audit controller 322 interprets and/or packages the instructions and indicators into suitable configuration and sends to the audit module 324 for performance. The audit controller 322 also preferably controls operation of the persistent monitor 326 more broadly, including by directing its standing operations which in preferred embodiments include continuously recording system state. The audit controller 322 also, in preferred embodiments, uses indicators to configure an indicator matcher 329 component which can perform instantaneous and historical matching on system state and memory using audit data and indicators.

The persistent monitor 326 of the endpoint agent 320 monitors the operating system file system state and memory of the endpoint in preferred embodiments. For example, it may be configured to detect "any file that is created", and, if one is created, to provide audit data about that operation to the indicator matcher 329 (audit data matching any criteria set, for example a criterion set by the audit controller 322, may also be persisted in the buffered storage module 328 for later, historical matching). The persistent monitor 326 may also be configured to automatically report, directly or by way of the verifier or other system components, certain system events as or after they occur at the endpoint(s) to other components of the system, for example to the threat monitor for incorporation into or interpretation as intelligence or to the verifier or audit controller 322 for further configuration of indicators that may be active at one or more endpoint agents 320. The endpoint agent 320 may also receive indicators and instructions that are used to refine the configuration of the persistent monitor 326 (and it, in turn, may modify operation of individual audit methods), including by limiting the criteria for recording information obtained from audits. For example, further to the example described immediately above, the criteria may be changed to "any file created at or below [a certain path]", which is a narrower set of events.

The buffered storage module 328 may be configured (manually, automatically, or using an adaptive algorithm) on a per module and/or per system state category basis (such as file system, network connections, DNS lookups, etc.) so that an endpoint system state that changes often (and thus generates more audit data) may be buffered, stored, tuned, and retained differently from states with different rates of change or size of payload.

As endpoint system state changes are detected and persisted, the persistent monitor 326 may communicate hit candidates to the indicator matcher component of the endpoint agent 320. As hit candidates information is matched against configured indicators by the indicator matcher 329, the indicator matcher 329 will communicate hit data to the audit controller 322 for packaging as completed work to be augmented with any relevant system state and data, additional context, sample data and/or time stamped snapshots of the data that matched the indicator. Hit data is then communicated back to the verifier as threat verification information for further analysis and dissemination.

Returning to FIG. 2, the verifier 210 retrieves verification information, including hit data and other intelligence from the endpoint agent 220 and performs further evaluation and correlation if required to determine if such information represents a verified threat. Verification by the verifier 210 may involve contacting and receiving information from other endpoint systems and even other networks, and the verifier may utilize the SIEM 230 to make such contacts and may otherwise communicate verification information to and through the SIEM 230. Verification information may contain a set of host or endpoint identification data, hit data, and other data that might aid a detector or other information system to correlate the endpoints' state and memory with the original threat. The SIEM 230, or similar system for performing such functions, may include syslog, using a format like CEF, or may be an HTTP receiver configured to accept a REST-style payload in a structured format like XML or JSON.

The SIEM 230 or other configured system may then present the verification information to a user or automatic correlation mechanism (such as any component of the threat monitor 200) or may perform further correlations itself, such as against data from other endpoint agent(s) and taking into account the indicators and instructions leading to the verification information, or against information obtained from other threat monitoring systems. The SIEM 230 may also forward the verification information as well as any other configured or received state information on to the original network monitor 202, such that it may correlate hit data and intelligence with its original detection of a threat or potential threat and present that verified threat to the user. The verifier 210 may further send a notification and location (such as a URL) at which a complete hit data set may be retrieved via an appropriately authorized and authenticated channel.

The correlations performed by the SIEM 230, verifier, and/or threat monitor may automatically trigger, for example via the controller discussed below, additional steps of the method of the present inventive concept to verify and/or contain threat(s). For example, the controller may receive the results of such correlations, analyze them to determine the threat level presented thereby, and initiate one or more of the following steps at the endpoint agent 220 and/or other endpoint agents communicatively coupled to the controller via the communication network: (1) further investigation to verify or gather additional information regarding the threat(s), and (2) containment actions regarding the threat(s). One or more of these steps may be performed based on a threshold evaluation that may take into account high-fidelity indicators such as the source of the verification information, the possible impact of execution of the threat(s) at one or more endpoint(s), the number of times the verification information has been detected at the endpoint agent 220, and the number of times the verification information has been reported from other endpoint agents. This weighted threshold analysis may take into account, and assign varying weight to, a number of different factors indicating the threat level and/or reliability of the verification information.

The verifier 210 may further enable a properly authorized user or machine to "contain" a threat, that is to take a containment action to restrict or alter endpoints or their software in a way that affects the threat or its operation, such as by limiting network communication. The verifier 210 may also present contained or otherwise threatened endpoints to a user or machine in a manner which allows users to take action including further investigation, remediation, and optionally release of containment agents.

Figure 4:
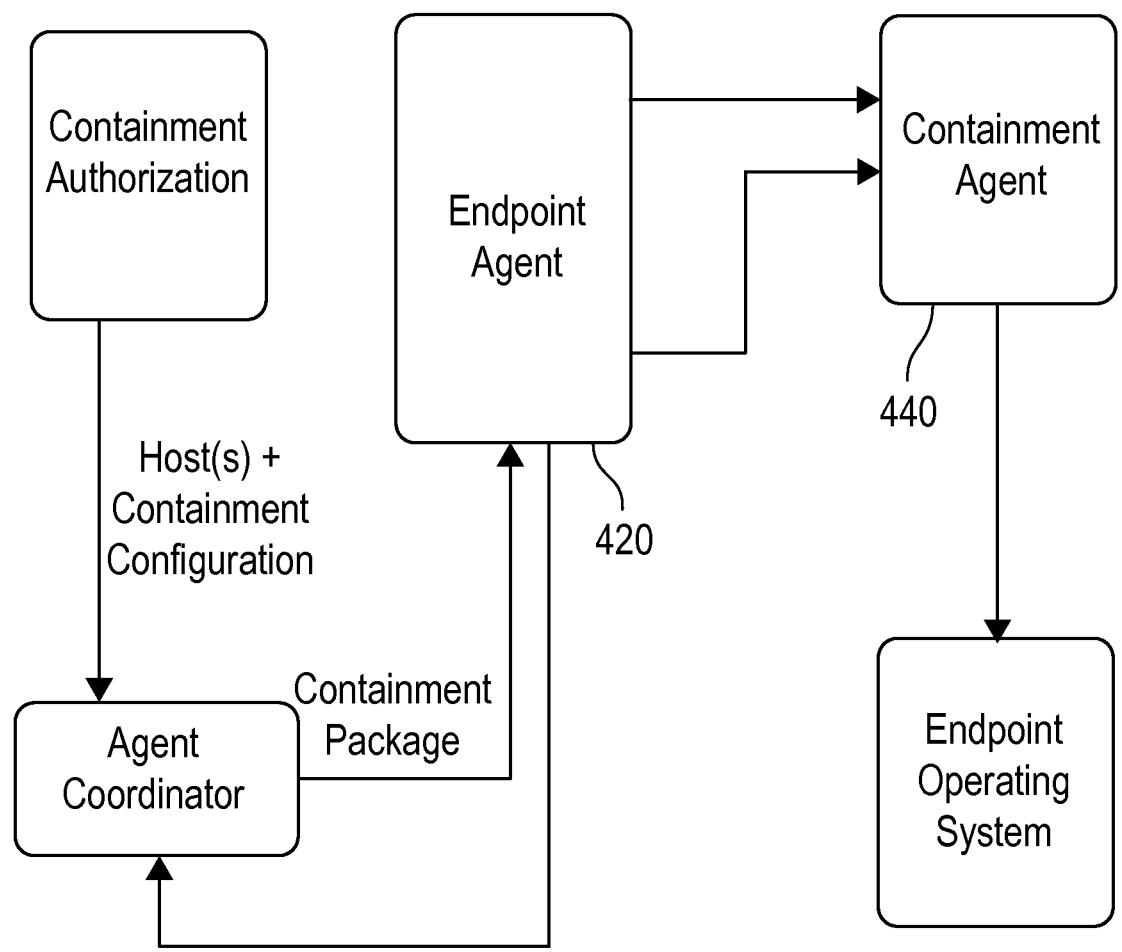
FIG. 4 is a flowchart, partially in block diagram form, illustrating an example of a system or process of the present inventive concept to perform a containment action.

FIG. 4 illustrates a containment workflow through an embodiment of the system of the present inventive concept. Initially, endpoints having endpoint agents 420 are selected for containment, and authorization of that containment is given or confirmed. A set of hosts or endpoints and a containment configuration information are selected and communicated to an agent coordinator 414. The agent coordinator 414 selects or generates and configures an appropriate containment package, which may contain configuration information, may describe a means to download executable code, may itself contain executable code, or any combination of these. An endpoint agent 420 receives the containment package and performs the steps it describes or instructs, either performing the containment actions itself or ultimately resulting in additional executable code being made available to the endpoint agent 420. If additional executable code is contained or described in the containment package, the endpoint agent 420 installs that executable code, or the "containment agent" 440, on the local host such that it is configured to affect system configuration and state.

The endpoint agent 420 may also configure the containment agent 440 using configuration data extracted from the containment package or otherwise determined or obtained by endpoint agent 420. The containment agent 440 makes changes to the system state and/or configuration, for example so that a threat on that endpoint may be contained, and notifies the endpoint agent 420 when the containment actions and results thereof are complete. The containment agent 440 can be instructed via a cryptographically secure channel and mechanism to perform actions intended to affect the ability of malicious software to function, communicate, send or receive instructions, or affect the system in other ways that "contain" the endpoint threat. It can also perform the above without affecting the endpoint's ability to communicate with the system coordinating its actions. Finally, the containment agent 440 can be instructed in a similar manner to cease the "contain" operation or containment actions in whole or in part, up to and including uninstalling the containment agent 440 itself, or requiring that it be deployed via the mechanism described above in order to perform further containment operations. The endpoint agent 420 communicates containment status and other host context information back to the agent coordinator 414 such that it can communicate information about the containment operation to a user or machine for display or other action.

The previous description of various embodiments of the presently disclosed inventive concept is provided to enable any person skilled in the art to make or use the present inventive concept. Various modifications will be readily apparent to those skilled in the art, and the generic principles defined herein may be applied alternatively without departing from the spirit or scope of the present inventive concept. Thus, the present inventive concept is not intended to be limited to the description herein but is to be accorded the widest scope consistent with the principles and novel features disclosed herein.

The steps of a method, system, or operation described in connection with embodiments of the present inventive concept disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Furthermore, the modules, agents, and other units described herein for performing steps of the present inventive concept may be executed by one processor, or by a plurality of processors housed within one computing device or a plurality of devices, communicatively coupled to a communication network. The processor(s) may represent one or more general-purpose processors such as a microprocessor, a central processing unit, or the like. More particularly, the processor may be a complex instruction set computing microprocessor, reduced instruction set computing microprocessor, very long instruction word microprocessor, or processor implementing other instruction sets or processors implementing a combination of instruction sets. The processor(s) may also be one or more special-purpose processors such as an application specific integrated circuit, a field programmable gate array, a digital signal processor, a network processor, a graphics processor, a network processor, a communications processor, a cryptographic processor, a co-processor, an embedded processor, or any other type of logic capable of processing instructions. The processor(s) is configured to execute instructions for performing the operations and steps discussed herein.

The modules, agents and other units described herein for performing steps of the present inventive concept may also be stored in and accessed from one or a plurality of memory locations for storing software program code (including application programs) and data structures associated with the embodiments described herein and that are addressable by the processor(s) and the communication network. The communication network may include a public computer network such as the Internet, in which case an optional firewall may be interposed between the communication network and one or more processors executing the modules, agents, and other units described herein, and/or between the communication network and the endpoints described herein. The communication network may alternatively be a private computer network such as a wireless telecommunication network, wide area network, or local area network, or a combination of networks.

Further, one or more of the modules, agents and other units described herein for performing steps of the present inventive concept may be stored and/or executed at the endpoint(s) of the present inventive concept. For example, the threat monitor may be stored on memory located at the endpoint(s), or be executed on a processor(s) at the endpoint(s), together with the endpoint agent(s) in one embodiment, without deviating from the spirit of the present inventive concept. Such units are communicatively coupled to the endpoint(s) via the communication network. A further example is where one or more of the modules, agents and other units described herein for performing steps of the present inventive concept, such as the threat monitor and the verifier's agent coordinator, are contained within middleware communicatively coupled to the communication network.

One or more of the modules, agents and other units described herein for performing steps of the present inventive concept may be controlled by a controller (data processing circuitry) communicatively coupled to a storage device and configured to manage and/or control one or more of such units. The controller may further provide updates to such units' software programs, and may be incorporated into one or more, or into all, of them, depending on the deployment.

Having now described the features, discoveries and principles of the present inventive aspect of this disclosure, the manner in which the present inventive aspect is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the present inventive aspect herein described, and all statements of the scope of the present inventive aspect which, as a matter of language, might be said to fall there between.

What is claimed is:

1. A computerized method to identify potentially malicious code in a network, the method comprising:
   analyzing information within a report associated with one or more threats resulting from a prior analysis of a portion of network data received over a network to yield intelligence that includes at least one of instructions or indicators related to the identified one or more threats and determining, based on the intelligence yielded from the information within the report, an endpoint device including an endpoint agent that is to (i) receive at least one of the instructions or the indicators, (ii) conduct an examination of memory of the endpoint device for data corresponding to any of the instructions or the indicators, and (iii) obtain results of the examination;
   gathering and correlating verification information with information gathered from one or more sources to determine whether the verification information corresponds to a verified threat, the verification information includes at least a portion of the results of the examination by the endpoint device and an identifier for the endpoint device; and
   sending a notification including a portion of the verification information to identify the verified threat.

2. The computerized method according to claim 1, wherein the correlating of the verification information is conducted processed by comparing the verification information to (a) data obtained from another endpoint device different than the endpoint device, or (b) data obtained from a security information and event manager module (SIEM).

3. The computerized method according to claim 1, wherein the endpoint agent is further configured to a system state of the endpoint device for data corresponding to any of the instructions or the indicators, and obtaining results of the test.

4. The computerized method according to claim 1, wherein prior to analyzing information within the report, the method further comprising:
   analyzing the portion of the network data by at least analyzing an executable by an analyzer of a threat monitor, the analyzer includes a dynamic analyzer that completely or partially executes the executable within an environment where operations of the executable are monitored to identify one or more behaviors or operations associated with the one or more threats.

5. The computerized method according to claim 4, wherein the information resulting from the analyzing of the portion of the network data includes an attempted change of the environment by the executable or one or more attempts to establish a network connection or a Domain Name System (DNS) lookup.

6. The computerized method according to claim 1, wherein the examination of the memory of the endpoint device comprises
   configuring the endpoint agent to receive the indicators;
   monitoring a state of the endpoint device and generating audit data in response to a monitored change of the system state; and
   providing data, based on the audit data, to the endpoint agent to determine whether the endpoint device is compromised based on a matching of data based on the audit data to any of the indicators.

7. The computerized method according to claim 4, further comprising:
   changing a configuration of the threat monitor based on the verification information.

8. The computerized method according to claim 1, further comprising:
   performing a containment action to mitigate effects of the verified threat on the endpoint device via the endpoint agent based on the verification information, wherein,
   the containment action is taken by a containment agent of the endpoint agent, and
   the containment agent is installed on the endpoint device pursuant to instructions contained in a containment package configured by a verifier that is analyzing the information within the report.

9. An endpoint agent for testing endpoint system state and examining memory within the endpoint system, comprising:
an indicator matcher component;
a persistent monitor communicatively coupled to the indicator matcher component, the persistent monitor to monitor at least system state of an endpoint device and provide audit data reporting an occurrence of a persistent change in the system state of the endpoint device; and
an audit controller coupled to the indicator matcher component and the persistent monitor, the audit controller to receive instructions or indicators, configure the indicator matcher component based on at least the received indicators, and control audits of at least the system state of the endpoint device conducted by the persistent monitor,
wherein the persistent monitor communicates the audit data associated with a persistent change in the monitored system state of the endpoint device to the indicator matcher component and the indicator matcher component outputs information from the endpoint agent in response to a correlation between the received indicators from the audit controller and the audit data associated with the persistent change in the monitored system state.

10. The endpoint agent according to claim 9, wherein the indicator matcher component outputs the information from the endpoint agent by sending a notification including intelligence to identify the instructions or indicators represent a verified threat.

11. The endpoint agent according to claim 9 being communicatively coupled to a verifier, the verifier including (i) a report analyzer and (ii) an agent coordinator, wherein
the report analyzer to analyze the information within the report and yield intelligence including the instructions or indicators to be provided to the agent coordinator, and
the agent coordinator to determine, based on the intelligence provided by the report analyzer, the endpoint agent.

12. The endpoint agent according to claim 10 further comprising:
a management component to further gather and correlate the verification information against data from one or more endpoint devices different than the endpoint device to determine that the verification information represents the verified threat.

13. The endpoint agent according to claim 9, wherein the audit controller is configured to control audits of memory performed by an audit module operating within the persistent monitor.

14. The endpoint agent according to claim 9, wherein an indicator of the indicators relating to a specific type or subset of information regarding a state of the endpoint device includes a description of a file or a hash sum of the file or regarding a description of an operation associated with the one or more threats.

15. A computerized method to identify potentially malicious code in a network, the method comprising:
analyzing information associated with one or more threats to yield intelligence that includes at least one of instructions or indicators related to the one or more threats and
determining, based on the intelligence, an endpoint device including an endpoint agent that is to (i) receive at least one of the instructions or the indicators, (ii) conduct an examination of memory of the endpoint device for data corresponding to any of the instructions or the indicators, and (iii) obtain results of the examination;
gathering and correlating verification information to determine whether the verification information corresponds to a verified threat, the verification information includes at least a portion of the results of the examination by the endpoint device and an identifier for the endpoint device; and
sending a notification including a portion of the verification information to identify the verified threat.

16. The computerized method according to claim 15, wherein the correlating of the verification information is conducted by comparing the verification information to (a) data obtained from another endpoint device different than the endpoint device, or (b) data obtained from a security information and event manager module (SIEM).

17. The computerized method according to claim 15, further comprising:
testing of a system state of the endpoint device for data corresponding to any of the instructions or the indicators, and obtaining results of the test.

18. The computerized method according to claim 15, wherein prior to analyzing information within the report, the method further comprising:
analyzing the portion of the network data by at least analyzing an executable by an analyzer of a threat monitor, the analyzer includes a dynamic analyzer that is configured to execute the executable within an environment where operations of the executable are monitored to identify one or more behaviors or operations associated with the one or more threats, and
wherein information resulting from the analyzing of the portion of the network data includes an attempted change of the environment by the executable or one or more attempts to establish a network connection or a Domain Name System (DNS) lookup.

19. The computerized method according to claim 15, wherein the examination of the memory of the endpoint device comprises
configuring the endpoint agent to receive the indicators;
monitoring a state of the endpoint device and generating audit data in response to a monitored change of the system state; and
providing data, based on the audit data, to the endpoint agent to determine whether the endpoint device is compromised based on a matching of data based on the audit data to any of the indicators.

20. The computerized method according to claim 15, further comprising:
performing a containment action to mitigate effects of the verified threat on the endpoint device via the endpoint agent based on the verification information, wherein,
the containment action is taken by a containment agent of the endpoint agent, and
the containment agent is installed on the endpoint device pursuant to instructions contained in a containment package configured by a verifier that is analyzing the information within the report.

21. The computerized method according to claim 15, wherein the gathering and correlating of the verification information comprises gathering and correlating verification information from multiple sources to determine whether the verification information corresponds to the verified threat.

* * * * *